United States Patent

Line

[11] Patent Number: 5,829,535
[45] Date of Patent: Nov. 3, 1998

[54] COMMON DEPTH CONTROL ADJUSTMENT FOR A GROUND OPENER

[76] Inventor: Douglas Line, 1061 Sidney Street E., Swift Current, Saskatchewan, Canada, S9H 1T8

[21] Appl. No.: 880,215

[22] Filed: Jun. 20, 1997

Related U.S. Application Data

[60] Provisional application No. 60/020,362, Jun. 24, 1996.

[51] Int. Cl.⁶ .............................. A01B 63/16; A01B 63/10
[52] U.S. Cl. .......................... 172/398; 172/401; 172/407; 172/423; 172/578; 172/635; 172/668; 172/739; 172/744; 172/748
[58] Field of Search ..................................... 172/395, 399, 172/398, 400, 401, 407, 408, 423, 410–412, 536, 578, 635, 668, 672, 675, 739, 744, 748

[56] References Cited

U.S. PATENT DOCUMENTS

| | | | |
|---|---|---|---|
| 2,829,577 | 4/1958 | Williams | 172/578 X |
| 3,552,498 | 1/1971 | Stauber | 172/397 X |
| 4,209,067 | 6/1980 | Poggemiller et al. | 172/578 X |
| 5,167,286 | 12/1992 | Bossler | 172/395 X |

OTHER PUBLICATIONS

The Furrow Magazine—Nov./Dec. 1995—"John Deere 1850 No Till Air Drill".
John Deere Air Seedings Systems pamphlet (pp. 12 & 13).
John Deere Drills pamphlet—"John Deere & 50 No–Till Drill"—p. 5.
K–Hart pamphlet—"K–Hart Double Disc Direct Seeding Unit" (2 pages).
Dutch Industries Ltd. pamphlet—"Kirby High Speed Culture" (1 page).

*Primary Examiner*—Michael J. Carone
*Assistant Examiner*—Christopher J. Novosad
*Attorney, Agent, or Firm*—Adrian D. Battison; Murray E. Thrift

[57] ABSTRACT

An agricultural apparatus comprises a main frame with ground wheels supporting the frame for movement across the ground and a plurality of ground engaging openers mounted on the frame for engaging the ground. Each opener includes a depth control wheel mounted on the opener frame member for movement in a direction for varying the height of the depth control wheel on the opener frame member to vary the depth of the opener element in the ground. A common adjustment apparatus for all the depth control wheels comprises an actuator, a common drive linkage mounted on the main frame and driven by the actuator and a plurality of individual adjustment members. A cam plate operable by the adjustment member. The depth control wheel is mounted on an arm on which is pivotally mounted on the opener frame member on a first pivot pin, the arm including a portion thereof for engaging the cam plate. Each adjustment member extends generally longitudinally of the respective opener frame member from an upper end adjacent the main frame to a lower end for actuating the depth control wheel, the adjustment member being arranged such that it lies substantially on a line radial to the pivot axis. The pivotal transfer link is pivotally connected to the adjustment member by a second pivot pin and the adjustment member is pivotally connected to the cam plate by a third pivot pin. A distance between the first pivot pin and the second pivot pin is small compared to the distance between the second pivot pin and the third pivot pin.

14 Claims, 5 Drawing Sheets

COMMON DEPTH CONTROL ADJUSTMENT FOR A GROUND OPENER

This application claims the benefit of Pro. App. No. 60/020,362, filed Jun. 24, 1996.

This invention relates to an agricultural apparatus of the type including a main frame with ground wheels for transporting the main frame across the ground. A plurality of ground openers is provided with the openers at spaced positions across the width of the frame for engaging the ground and opening a furrow. Each ground opener is pivotally mounted on the main frame. The depth of the opener can be controlled by vertical movement of the opener with a depth control wheel mounted on each opener for rolling on the ground and controlling the depth of operation of the opener.

BACKGROUND OF THE INVENTION

Various arrangements of this type have previously been proposed. Various different arrangements for the opener are provided including knives, sweeps, double discs and single angle discs. In some cases, the depth control wheel is mounted on a suitable element of the ground opener in a manner which allows adjustment of the height of the ground wheel relative to the ground opener.

Examples of such arrangements are shown as follows:

John Deere Air Seedings Systems pamphlet pages 12 and 13 showing the 730 Air Disc Drill.

John Deere 750 No-Till Drill shown in the "John Deere Drills" pamphlet on page 5.

John Deere 1850 NO TILL AIR DRILL as shown in the November–December 1995 magazine "The Furrow". The opener is the same as the above 750 but the machine is different.

The Barton No-Till Disc Seeding system shown in a pamphlet issued by Flexi-Coil.

The K-Hart Double Disc Direct Seeding Unit as shown in a pamphlet.

The Kirby High Speed Culture as shown in a pamphlet issued by Dutch Industries.

In all these cases, each opener is adjusted individually so that the height of the depth control wheel on the opener mounting system is individually adjustable.

It is of course highly desirable that the apparatus be as wide as practical and therefore the number of openers on the frame can be relatively high so that the manual adjustment of each opener is time consuming and laborious.

SUMMARY OF THE INVENTION

It is one object of the present invention, therefore, to provide an improved arrangement in which the height of the depth control wheel relative to the opener can be adjusted simultaneously for each of the openers.

According to one aspect of the invention there is provided an n agricultural apparatus comprising:

a main frame;

ground wheels supporting the frame for movement across the ground;

a plurality of ground engaging openers mounted on the frame at transversely spaced positions therealong for engaging the ground;

each opener comprising an opener frame member and an opener element mounted on the frame member for engaging into the ground and opening a furrow;

the opener frame member being mounted on the main frame for pivotal movement about a pivot axis adjacent to the main frame to cause height adjustment movement relative to the main frame of the opener element;

a depth control wheel mounted on the opener frame member for rolling on the ground and controlling a depth of engagement into the ground of the opener element;

the depth control wheel being mounted on the opener frame member for movement in a direction for varying the height of the depth control wheel on the opener frame member to vary the depth of the opener element in the ground;

and an adjustment apparatus comprising an actuator, a common drive linkage mounted on the main frame and driven by the actuator and a plurality of individual adjustment members, each associated with a respective one of the depth control wheels and each driven by the common drive linkage for adjusting movement of the depth control wheel of each of the ground engaging openers simultaneously.

Preferably each adjustment member extends generally longitudinally of the respective opener frame member from an upper end adjacent the main frame to a lower end for actuating the depth control wheel, the adjustment member being arranged such that it lies substantially on a line radial to the pivot axis.

Preferably the adjustment member is a rod for effecting a pushing action on the depth control wheel.

Preferably there is provided a cam plate operable by the adjustment member so as to locate the depth control wheel in a predetermined position.

Preferably there is provided a cam plate operable by the adjustment member so as to locate the depth control wheel in a predetermined position.

Preferably there is provided a cam plate operable by the adjustment member so as to locate the depth control wheel in a predetermined position.

Preferably the depth control wheel is mounted an arm on which is pivotally mounted on the opener frame member.

Preferably the depth control wheel is mounted on an arm on which is pivotally mounted on the opener frame member, the arm including a portion thereof for engaging the cam plate.

Preferably the cam plate is pivotally mounted on the opener frame member.

Preferably the arm is pivotally mounted at a position part way along its length with its depth control wheel at one end and the portion engaging the cam plate at the opposed end.

Preferably the adjustment member extends to a position so that an upper end thereof is spaced downwardly and rearwardly from the pivot axis and wherein there is provided a pivotal transfer link pivotally mounted on the main frame and operable by the common drive linkage.

Preferably there is provided a cam plate operable by the adjustment member so as to locate the depth control wheel in a predetermined position; wherein the depth control wheel is mounted on an arm which is pivotally mounted on the opener frame member on a first pivot pin, the arm including a portion thereof for engaging the cam plate; wherein each adjustment member extends generally longitudinally of the respective opener frame member from an upper end adjacent the main frame to a lower end for actuating the depth control wheel, the adjustment member being arranged such that it lies substantially on a line radial to the pivot axis; wherein the pivotal transfer link is pivotally connected to the adjustment member by a second pivot pin and the adjustment member is pivotally connected to the cam plate by a third pivot pin; and wherein a distance between the first pivot pin and the second pivot pin is small compared to the distance between the second pivot pin and the third pivot pin.

Preferably the second pivot pin is aligned with the first pivot pin.

As an alternative preferred feature, the rod is replaced by a cable which is pulled through a guide at the pivot axis of the pivot arm by the actuating member.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

The apparatus of the present invention is shown only schematically and can apply to any opener arrangement in which the depth of the opener is controlled. This can be used for banding fertilizer, seeding or application of other materials to the ground.

As shown the opener is in the form of a disc which is again shown schematically but other types of opener can be used for the present invention. The necessary elements for transporting the materials to be injected in the ground are not shown as these are well known to one skilled in the art.

Figure 1:
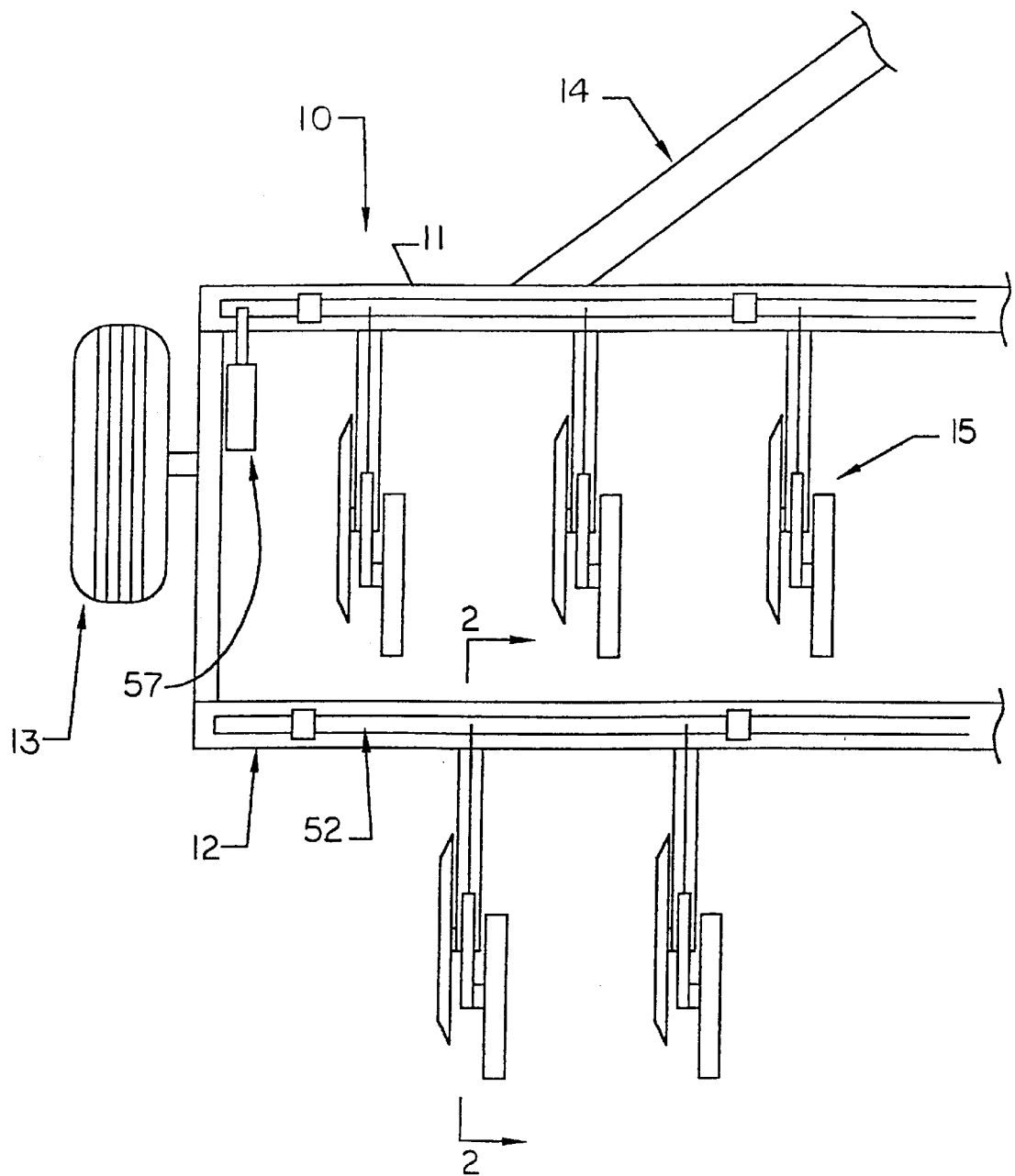
FIG. 1 is a top plan view showing schematically an agricultural apparatus according to the present invention.

Schematically, therefore, the apparatus as shown in FIG. 1 comprises a frame generally indicated at 10 with a first tool bar 11 and a second tool bar 12 parallel to the first. The frame is mounted on suitable ground wheels 13 for transportation across the ground under propulsion from a suitable towing vehicle attached to a hitch 14.

Each tool bar 11 and 12 carries a plurality of ground opener elements 15 at spaced positions along the length of the tool bar with the elements being staggered so as to provide the required spacing in action on the ground.

Figure 2:
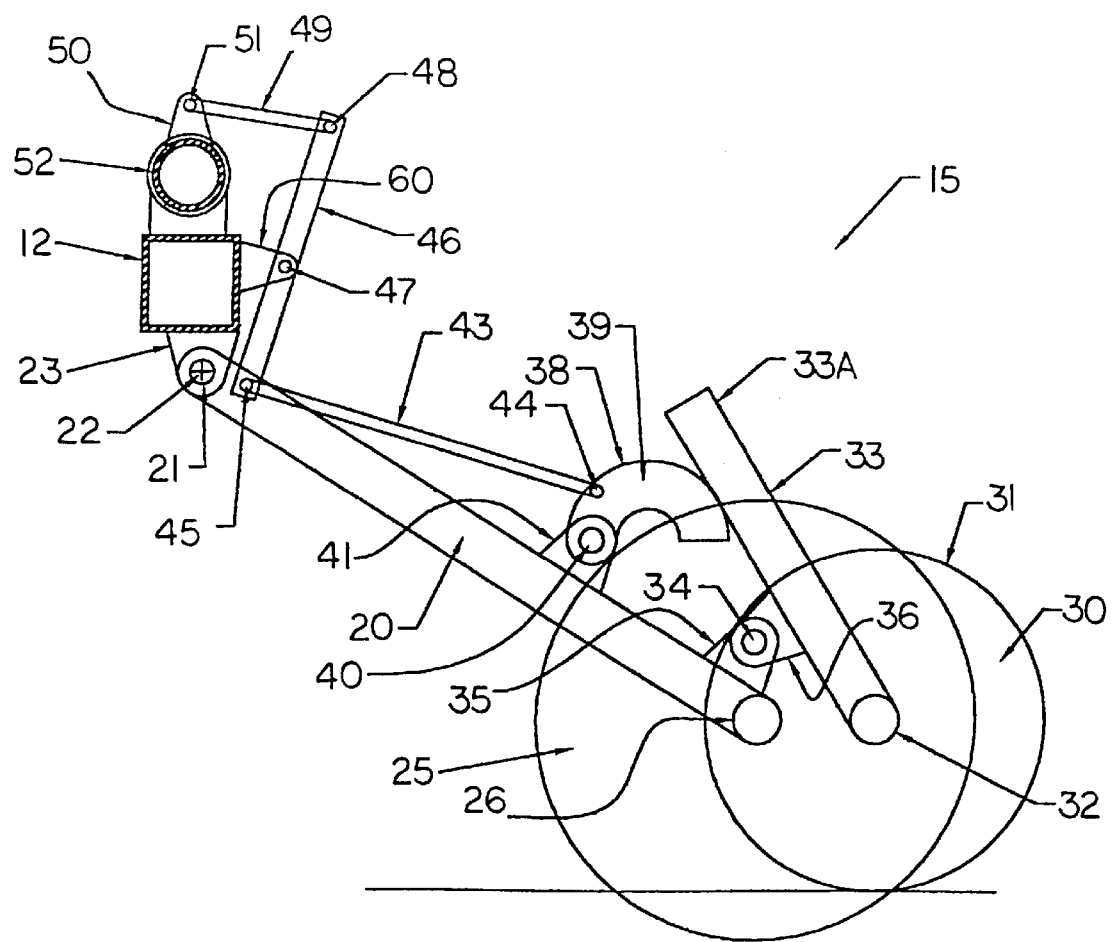
FIG. 2 is a cross sectional view along the lines 2—2 showing a first embodiment of a common adjustment system for the apparatus of FIG. 1.

Turning now to FIG. 2, the construction of one of the openers 15 is shown in more detail mounted on the tool bar 12.

The opener 15 comprises an opener frame member 20 which is pivotally mounted on a pin 21 for pivotal movement about an axis 22, the pin being mounted in a device 23 welded on an underside of the second tool bar 12. The axis 22 is thus parallel to the main beam and horizontal so that a rear end of the frame member 20 can pivot upwardly and downwardly about the axis 22. A spring compression system and trip is provided but is not shown since this is a conventional item well known to one skilled in the art. The trip allows the frame member 20 to lift if necessary to clear an obstacle. The spring provides downward pressure on the frame member 20 to compress the frame member down toward the ground to apply force onto the opener 25 carried at the lower end of the frame member 20.

In the embodiment shown the opener 25 is a disc mounted for rotational movement about a shaft 26 carried on the lower end of the frame member 20. The disc thus rotates about a horizontal axis with a lowermost part of the disc edge engaging into the ground in an opening action forming a furrow for receiving materials to be injected into the ground.

The depth control wheel 30 is provided on the frame member 20 and is arranged with a periphery 31 of the wheel rolling on the ground surface and thus controlling the height of the lower end of the frame member and thus the depth of penetration of the opener 25 into the ground.

The depth control wheel 30 is mounted on a hub 32 carried on an arm 33 which lies in the same plane as the frame member 20 and is pivotally coupled thereto by a pin 34 interconnecting lugs 35 and 36 carried on the frame member 20 and the arm 33 respectively.

The arm 33 includes an upper portion 33A projecting beyond the mounting lug 36 on opposite side of the mounting lug from the hub 32. The portion 33A engages against a cam surface 38 of a cam plate 39. The cam surface 38 thus provides a stop against which a lower surface of the portion 33A engages thus limiting the counterclockwise pivotal movement of the arm 33 about the pin 34 to the stop defined by the cam surface. The spacing of the cam surface from the frame member 20 can be adjusted by pivoting movement of the cam plate 39 about a pin 40 mounted on a lug 41 carried on the frame member 20.

Thus adjustment of the cam plate 39 adjusts the angle of the arm 33 to the frame member 20 and thus adjusts the height of the hub 32 and the periphery of the wheel relative to the shaft 26.

The position of the cam plate 39 is adjusted by an actuation rod 43 in the form of an elongate straight rod having a pin 44 at a lower end attached to the cam plate so as to actuate pivotal movement of the cam plate about the pin 40. A pin 45 at an upper end of the rod is connected to a transfer link 46 in the form of an elongate straight beam. The transfer link 46 is pivotally mounted on the tool bar 12 for pivotal movement about a pin 47 carried on a lug 60 on a rear surface of the tool bar. The transfer link 46 is mounted in the same plane as the elongate beam forming the frame member 20. The transfer link 46 is pivotally mounted at a position along its length, which may be at its centre, and extends to an upper end at which is provided a pin 48 actuated by an arm 49 carried on a crank 50 and coupled thereto by a pin 51. The crank 50 is welded to a shaft 52 which extends along the top of the tool bar 12 substantially along the full length thereof for engagement with each of the openers 15. Thus the shaft 52 carries a plurality of the cranks 50 at spaced positions each associated with a respective one of the openers. The shaft 52 is rotated by a hydraulic cylinder 57 actuated by a suitable control preferably in the cab of the towing vehicle.

For the success of the adjustment mechanism described above, the following geometrical concepts are preferably maintained:

a) Pivot axis 22, pin 45 and pin 44 should preferably be aligned as closely as possible through the working range of the adjustment. Ideally they should always remain perfectly aligned. In practice, as long as they are closely aligned, the mechanism will serve its intended function very well.

b) The distance between pin 45 and pin 21 should preferably be very small compared to the distance between pin 45 and pin 44. Ideally pin 45 would be aligned with pin 21 or as close as practical. In practice, as long as the ratios of these distances are as described above, the mechanism will serve its intended function very well.

c) The smaller the ratio of the distance between pin 45 and pin 21 compared to the distance between pin 45 and pin 44, the more misalignment between pins 21, 45 and 44 can be tolerated.

It will be noted that the rod 43 lies on a line which is radial to the pivot axis 22. However the pin 45 is spaced outwardly from the axis 22 so that the rod does not reach the axis or the pin 21 and is spaced rearwardly therefrom in all positions of its actuation by the arm 49.

In operation, the position of the cam plate 39 and therefore the depth setting is actuated by rotating the shaft 52 to a required position which actuates the crank and the transfer link thus pushing on the rod 43 to effect movement of the cam plate.

The arrangement of the rod relative to the frame member 20 by which the rod passes through the pivot axis of the frame member allows the frame member to move upwardly and downwardly in the conventional action to accommodate differences in ground height relative to the tool bar. As the rod 43 lies on the radius of the pivot axis 22, the pivotal action of the frame member 20 does not affect the position of the cam plate 39 so that the depth remains constant.

Figure 3:
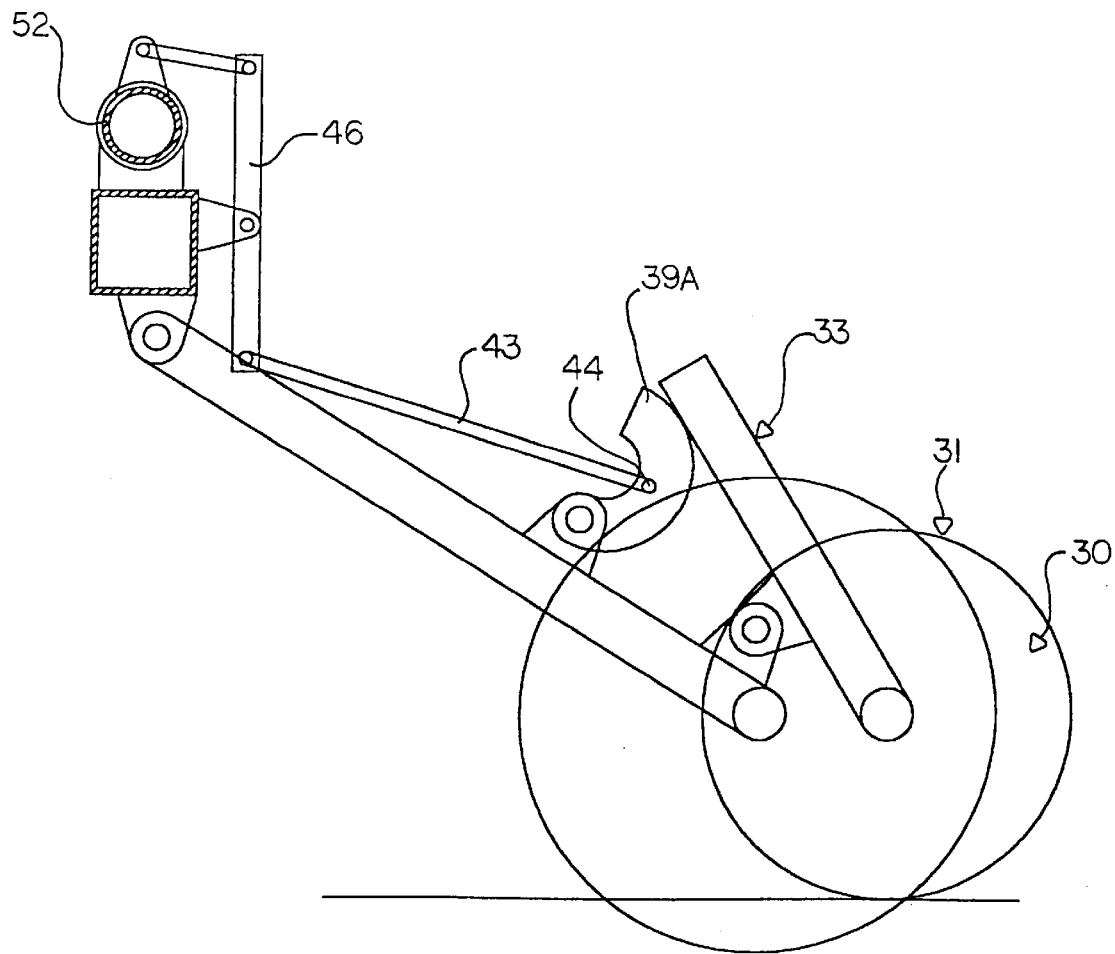
FIG. 3 is a cross sectional view similar to that of FIG. 2 showing a second embodiment of a common adjustment system for the apparatus of FIG. 1.

In FIG. 3 is shown a slightly modified arrangement in which the cam plate 39A is mounted so that it pivots, by actuation from the shaft 52 and the link 46, in a direction which is opposite to that of FIG. 2 to effect adjustment from high depth to low depth.

Figure 4:
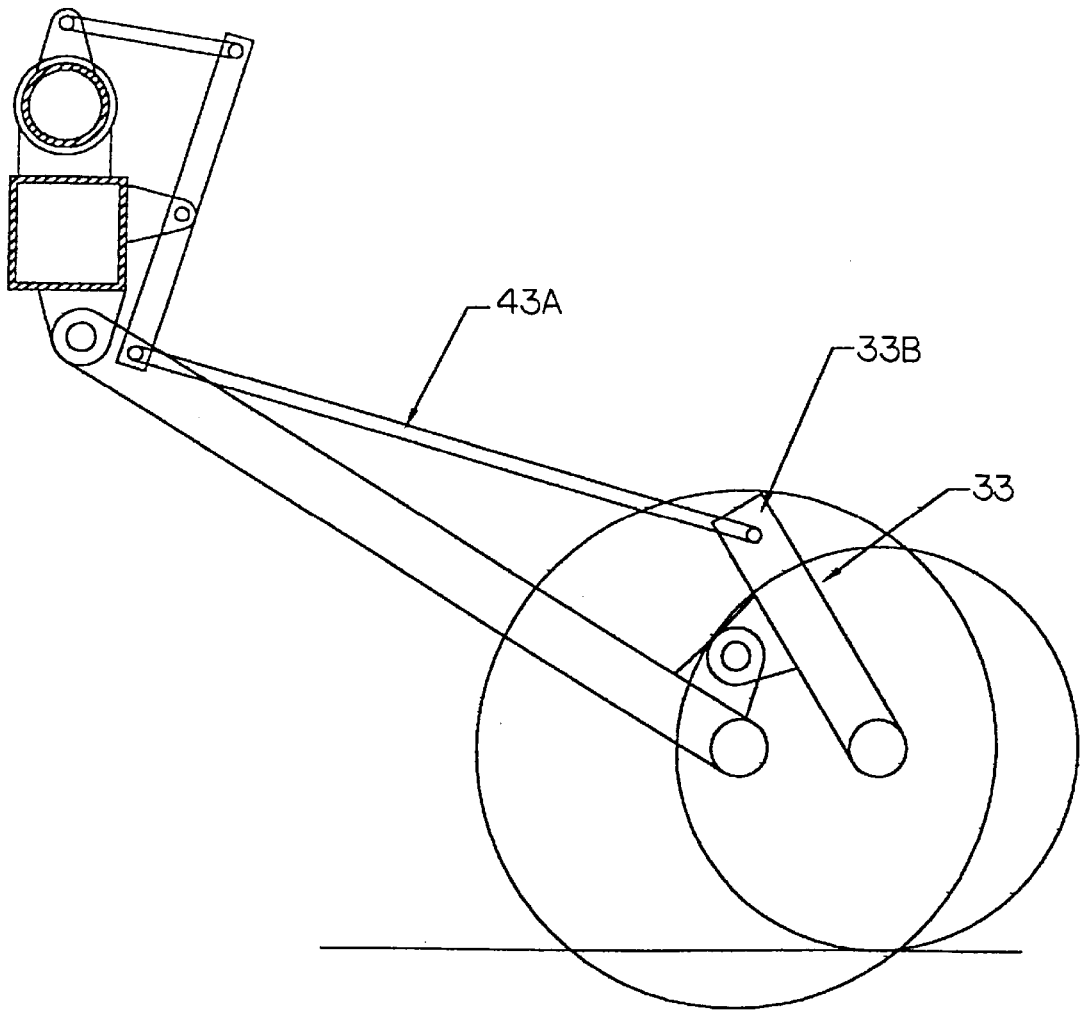
FIG. 4 is a similar cross sectional view to that of FIG. 2 showing a third embodiment of a common adjustment system for the apparatus of FIG. 1.

In FIG. 4 is shown a yet further modified arrangement in which the rod 43A extends directly to and engages the portion 33B of the arm 33.

The cam plate arrangement shown in FIGS. 2 and 3 has the advantage that the force from the depth control wheel is applied to the cam plate and thus avoids the direct application of significant force to the rod 43. In the embodiment shown in FIG. 4, the arrangement has the advantage of simplicity but significant forces are applied to the rod 43A so that its strength must be increased relative to the previous arrangements. Similarly the transfer link and the common shaft must also accommodate significantly increased forces.

In all cases the mounting of the rod allows the pivotal action of the support frame 20 to occur without affecting the adjustment of the depth control.

Figure 5:
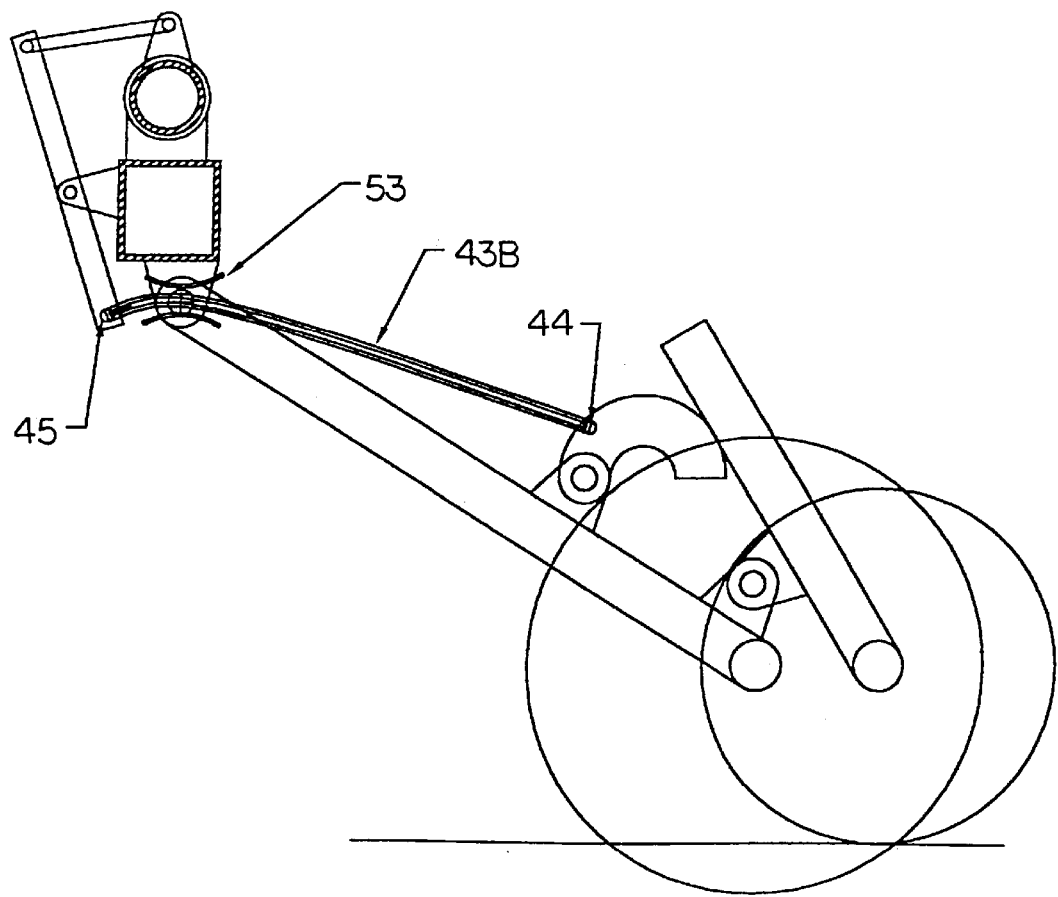
FIG. 5 is a similar cross sectional view to that of FIG. 2 showing a second embodiment of a common adjustment system for the apparatus of FIG. 1 using a cable in replacement for the rod of the above embodiments.

Another variation of this mechanism shown in FIG. 5 uses a cable 43B extending from pin 45 to pin 44 of the cam plate 39. The cable 43B passes through a guiding mechanism 53 aligned with pin 21. In this variation beam 46 may be located in an alternate mechanism 53 aligned with pin 21, thus maintaining perfect alignment through the pivot axis 22. In this variation link 46 may be located on the front side of the beam 12 to effect a pulling action on the pin 45 rather than the pushing action of the previous embodiments.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An agricultural apparatus comprising:

a main frame;

ground wheels supporting the main frame for movement across the ground;

a plurality of ground engaging openers mounted on the main frame at transversely spaced positions therealong for engaging the ground;

each opener comprising an opener frame member and an opener element mounted on the opener frame member for engaging into the ground and opening a furrow;

the opener frame member being mounted on the main frame for pivotal movement about a pivot axis adjacent to the main frame to cause height adjustment movement relative to the main frame of the opener element;

a depth control wheel mounted on the opener frame member for rolling on the ground and controlling a depth of engagement into the ground of the opener element;

the depth control wheel being mounted on the opener frame member for movement in a direction for varying the height of the depth control wheel on the opener frame member to vary the depth of the opener element in the ground;

and an adjustment apparatus comprising an actuator, a common drive linkage mounted on the main frame and driven by the actuator and a plurality of individual adjustment members, each associated with a respective one of the depth control wheels and each driven by the common drive linkage for adjusting movement of the depth control wheel of each of the ground engaging openers simultaneously.

2. The apparatus according to claim 1 wherein each adjustment member extends generally longitudinally of the respective opener frame member from an upper end adjacent the main frame to a lower end for actuating the depth control wheel, the adjustment member being arranged such that it lies substantially on a line radial to the pivot axis.

3. The apparatus according to claim 2 wherein the adjustment member is a rod for effecting a pushing action on the depth control wheel.

4. The apparatus according to claim 3 including a cam plate operable by the adjustment member so as to locate the depth control wheel in a predetermined position.

5. The apparatus according to claim 2 wherein the adjustment member is a cable for effecting a pulling action on the depth control wheel.

6. The apparatus according to claim 5 including a cam plate operable by the adjustment member so as to locate the depth control wheel in a predetermined position.

7. The apparatus according to claim 1 including a cam plate operable by the adjustment member so as to locate the depth control wheel in a predetermined position.

8. The apparatus according to claim 7 wherein the depth control wheel is mounted on an arm which is pivotally mounted on the opener frame member, the arm including a portion thereof for engaging the cam plate.

9. The apparatus according to claim 8 wherein the cam plate is pivotally mounted on the opener frame member.

10. The apparatus according to claim 9 wherein the arm is pivotally mounted at a position part way along its length with its depth control wheel at one end and the portion engaging the cam plate at the opposed end.

11. The apparatus according to claim 1 wherein the depth control wheel is mounted on an arm which is pivotally mounted on the opener frame member.

12. The apparatus according to claim 1 wherein the adjustment member extends to a position so that an upper end thereof is spaced downwardly and rearwardly from the pivot axis and wherein there is provided a pivotal transfer link pivotally mounted on the main frame and operable by the common drive linkage.

13. The apparatus according to claim 12 wherein there is provided a cam plate operable by the adjustment member so as to locate the depth control wheel in a predetermined position; wherein the depth control wheel is mounted on an arm which is pivotally mounted on the opener frame member on a first pivot pin, the arm including a portion thereof for engaging the cam plate; wherein each adjustment member extends generally longitudinally of the respective opener frame member from an upper end adjacent the main frame to a lower end for actuating the depth control wheel, the adjustment member being arranged such that it lies substantially on a line radial to the pivot axis; wherein the pivotal transfer link is pivotally connected to the adjustment member by a second pivot pin and the adjustment member is pivotally connected to the cam plate by a third pivot pin; and wherein a distance between the first pivot pin or pivot axis and the second pivot pin is smaller than the distance between the second pivot pin and the third pivot pin.

14. The apparatus according to claim 13 wherein the second pivot pin is aligned with the first pivot pin.

* * * * *